(12) United States Patent
Bishka

(10) Patent No.: US 12,241,578 B2
(45) Date of Patent: Mar. 4, 2025

(54) METHOD FOR ASSEMBLING CONDUIT SECTIONS

(71) Applicant: S-P Products, Inc., Elk Grove Village, IL (US)

(72) Inventor: Mikel Bishka, Wheaton, IL (US)

(73) Assignee: S-P Products, Inc., Elk Grove Village, IL (US)

( * ) Notice: Subject to any disclaimer, the term of this patent is extended or adjusted under 35 U.S.C. 154(b) by 0 days.

(21) Appl. No.: 18/436,740

(22) Filed: Feb. 8, 2024

(65) Prior Publication Data

US 2024/0263730 A1 Aug. 8, 2024

Related U.S. Application Data

(60) Provisional application No. 63/444,046, filed on Feb. 8, 2023.

(51) Int. Cl.
*F16L 47/02* (2006.01)
*B23P 15/00* (2006.01)
*F16L 21/08* (2006.01)

(52) U.S. Cl.
CPC ............. *F16L 47/02* (2013.01); *B23P 15/00* (2013.01); *F16L 21/08* (2013.01); *Y10T 29/49982* (2015.01)

(58) Field of Classification Search
CPC ....... F16L 47/02; F16L 13/103; F16L 41/082; B23P 15/00; Y10T 29/49982
See application file for complete search history.

(56) References Cited

U.S. PATENT DOCUMENTS

| | | | | | |
|---|---|---|---|---|---|
| 4,882,886 | A | * | 11/1989 | Harbeke | ............... E04G 15/061 52/220.8 |
| 6,101,774 | A | * | 8/2000 | Heil | ....................... E04G 15/061 52/220.8 |
| 8,505,251 | B1 | * | 8/2013 | Scruggs | .................. E04C 2/521 52/220.8 |
| 10,320,167 | B2 | * | 6/2019 | Krause | ..................... F16L 55/10 |
| 10,473,253 | B2 | * | 11/2019 | Vrame | .................. F16L 41/002 |
| 10,727,658 | B2 | * | 7/2020 | Fedowitz | ............. H02G 3/0481 |
| 2008/0012338 | A1 | * | 1/2008 | Wiese | ....................... H02G 3/38 285/417 |

* cited by examiner

*Primary Examiner* — Sarang Afzali
(74) *Attorney, Agent, or Firm* — Wood, Phillips, Katz, Clark & Mortimer

(57) ABSTRACT

A method of assembling conduit section in a building or like structure includes providing a first conduit section within an associated concrete slab, and adhering a connector sleeve to the first conduit section before concrete is deposited about the first conduit section and the connector sleeve. Concrete is deposited to a grade level generally at the same height as the connector sleeve. A coupling element having upper and lower section is next adhered to the connector sleeve so that the coupling element extends above the concrete slab. An associated second conduit sections or the like can then be efficiently joined to the upper section of the coupling element, to thereby join the second conduit section, positioned above the concrete slab, to the first conduit section positioned within the slab.

10 Claims, 2 Drawing Sheets

(a) PVC TO RIGID
(b) PVC TO FLEXIBLE
(c) PVC TO LIQUID-TIGHT
(d) PVC TO ALUMINUM (a) PVC TO EMT
(b) PVC TO STEEL
(c) PVC TO END BELL
(d) PVC TO SMOOTH BUSHING

METHOD FOR ASSEMBLING CONDUIT SECTIONS

CROSS-REFERENCE TO RELATED APPLICATIONS

This application claims priority of Provisional Ser. No. 63/444,046 filed Feb. 8, 2023, the disclosures of which are hereby incorporated by reference in their entireties.

FIELD OF THE INVENTION

The present invention relates generally to installation and assembly of conduits, tubing, and like components in a building or other structure, including conduit sections frequently made from polyvinyl chloride (PVC), and suitable metallic materials, for housing wiring and like components in a building or other structure, and more particularly to an efficient method for joining a conduit section to conduit section positioned in a concrete slab of a structure.

BACKGROUND OF THE INVENTION

In connection with typical construction projects for buildings and other structures, it is ordinarily necessary to provide assemblies of conduit for housing electrical wiring and associated components. Electrical conduit and related accessories may be made from a variety of materials such as polyvinyl chloride (PVC), thin wall metal, heavy wall metal, flexible tubing (MC cable and other types of flexible cable), as well as other materials known to those skilled in the art to durably and reliably house the electrical elements.

Couplings are generally used to connect tubing, such as electrical conduit, to various other forms of electrical tubing and support structures. In some applications, electrical conduit can be arranged to extend at least partially within a floor structure, such as a concrete slab. In the course of a typical installation, it may be necessary for electrical workers to provide conduit components which extend from within a concrete slab or like floor element for connection with other components positioned exteriorly of and above the concrete slab.

Bearing in mind that electrical wiring positioned within the conduit components must be threaded and directed through the various conduit components, it is desirable to provide an arrangement which facilitates efficient assembly of the components. Effecting such connections can be time-consuming, requiring that conduit sections be securely joined, while avoiding uneven surface on the interior of the conduit sections which could otherwise inhibit the smooth and efficient threading of wiring through the assembled conduit sections.

The present invention contemplates a method of assembling conduit sections which facilitates joining conduit sections to be positioned in concrete with a section positioned above the concrete slab. Notably, this desirably avoids the need to ream or otherwise modify the various conduit components to facilitate assembly.

SUMMARY OF THE INVENTION

In accordance with the present invention, a method of assembling conduits sections first comprises the step of providing a first conduit section, typically PVC, for positioning within an associated concrete slab, as typically found in connection with a building or like structure. To facilitate assembly of a conduit section to the section to be housed in concrete, the present method next includes providing a connector sleeve, sometimes referred to as a slip coupling, which is ordinarily also made from PVC. The connector sleeve is adhered with adhesive to the first conduit section so that the first conduit section extends upwardly within the connector sleeve.

The present method next contemplates depositing concrete about the first conduit section and the connector sleeve to a grade level generally at the same height as the top of the connector sleeve. The connector sleeve can be readily identified as a "circle" or "ring" at the grade level of the concrete. A removable plug, adhesive tape, or other cover can be provided on the top of the connector sleeve to close the interior while the concrete is poured.

Next, a coupling element having a lower polymeric section, typically PVC, and an upper section is provided. The coupling element may comprise an assembly, including an upper section which is metallic, or may be unitary with the upper section comprising polymeric material such as PVC.

The lower polymeric section of the coupling element is inserted into and adhered with adhesive to the connector sleeve, with the lower polymeric section extending downwardly within the connector sleeve. The components are assembled such that the coupling element projects above the deposited concrete.

Assembly of the conduit sections is completed by joining a second conduit section to the upper section of the coupling element, to thereby join the second conduit section positioned above the slab to the first conduit section positioned in the slab.

In the preferred practice of the invention, the connector sleeve includes an internal, annular shoulder. The first conduit section extends upwardly within the connector sleeve to abut a lower surface of the internal, annular shoulder. The lower polymeric section of the coupling element extends downwardly within the connector sleeve to abut an upper surface of the internal, annular shoulder.

For versatility of application, the upper metallic section of the coupling element comprises one of: (1) a galvanized rigid conduit; (2) a liquid-tight connector; and (3) a slip-flex/flexible coupling. The upper metallic section may be rigid or flexible, and may comprise aluminum, steel, or EMT (electric metallic tubing).

To facilitate threading of wiring through the assembled conduit sections, an inside diameter of the lower polymeric section of the coupling element preferably corresponds to an inside diameter of the first conduit section, with the internal shoulder of the connector sleeve also sized to avoid interfering with threading of wiring.

Other features and advantages of the present invention will be readily apparent from the following detailed description, the accompanying drawings, and the appended claims.

DETAILED DESCRIPTION OF THE INVENTION

While the present invention is susceptible to embodiment in various forms, there is shown the drawings and will hereinafter be described presently preferred embodiments, with the understanding that the present disclosure is to be considered as an exemplification of the invention, and is not intended to limit the invention to the specific embodiments illustrated.

In accordance with the present invention, a method of assembling conduits sections first comprises the step of providing a first conduit section 10, typically PVC, to be positioned within an associated concrete slab C, as typically found in connection with a building or like structure.

To facilitate assembly of a conduit section to the conduit section to be housed in concrete, the present method next includes providing a connector sleeve 12, sometimes referred to as a slip coupling, which is ordinarily also made from PVC. The connector sleeve 12 is adhered with adhesive to the first conduit section 10 so that the first conduit section 10 extends upwardly within the connector sleeve.

Figure 1:
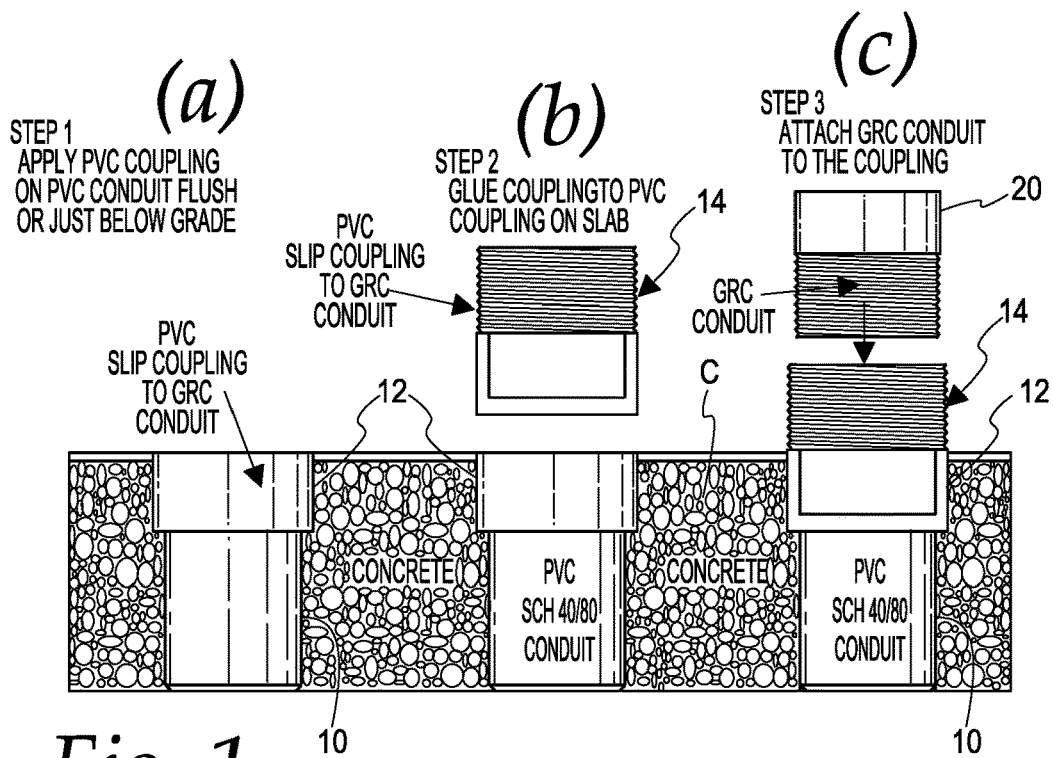
FIGS. 1a-c are diagrammatic views of the steps for assembling conduit sections in accordance with the present invention.
Figure 2:
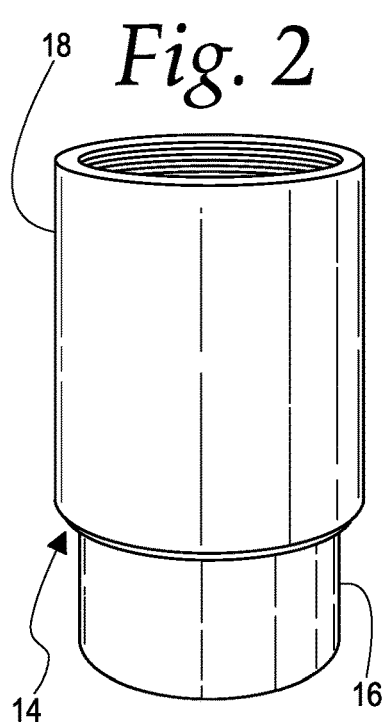
FIG. 2 is a perspective view of a coupling element that can be employed for practicing the present invention.
Figure 3:
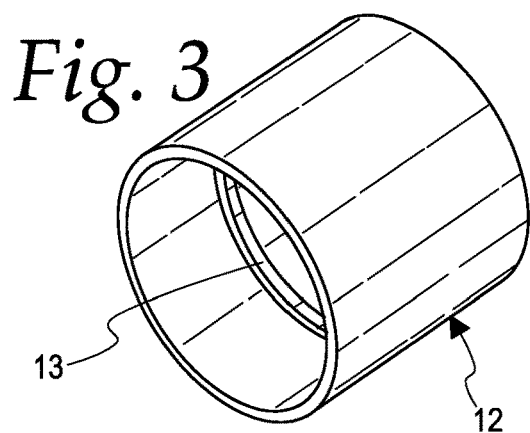
FIG. 3 is a perspective, diagrammatic view of a connector sleeve for practicing the present invention.
Figure 4:
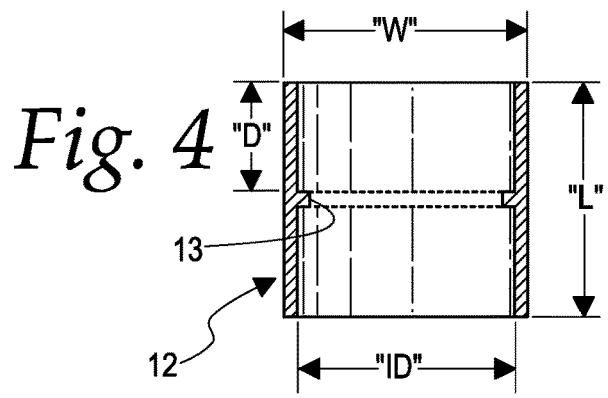
FIG. 4 is a diagrammatic cross-sectional view of the connector sleeve shown in FIG. 3.

The present method next contemplates depositing concrete about the first conduit section 10 and the connector sleeve 12 to a grade level generally at the same height as the top of the connector sleeve 12 (see FIG. 1a). The connector sleeve 12 can be readily identified as a "circle" or "ring" at the grade level of the concrete.

Next, as shown in FIG. 1b, a coupling element 14 having a lower polymeric section 16, typically PVC, and an upper section 18, which may be metallic, is provided. As shown in FIG. 1c, the lower polymeric section 16 of the coupling element 14 is inserted into and adhered with adhesive to the connector sleeve 12, with the polymeric section 16 extending downwardly within the connector sleeve 12. The components are assembled such that the coupling element 14 projects above the deposited concrete.

As shown further in FIG. 1c, assembly of the conduit sections is completed by joining a second conduit 20 section to the upper section 18 of the coupling element 14, to thereby join the second conduit section 20 to the first conduit section 10.

In the preferred practice of the invention, the connector sleeve 12 includes an internal, annular shoulder 13. The first conduit section 10 extends upwardly within the connector sleeve 12 to abut a lower surface of the internal, annular shoulder 13. The polymeric lower section of the coupling element 14 extends downwardly within the connector sleeve 12 to abut an upper surface of the internal, annular shoulder. For versatility of application, the upper section of the coupling element 14 can comprise a metallic section comprising one of: (1) a galvanized rigid conduit; (2) a liquid-tight connector; and (3) a slip-flex/flexible coupling.

To facilitate threading of wiring through the assembled conduit sections, an inside diameter of the polymeric lower section 16 of the coupling element 14 preferably corresponds to an inside diameter of the first conduit section 10, with the internal shoulder 13 of the connector sleeve 12 also sized to avoid interfering with threading of wiring.

Figure 5:
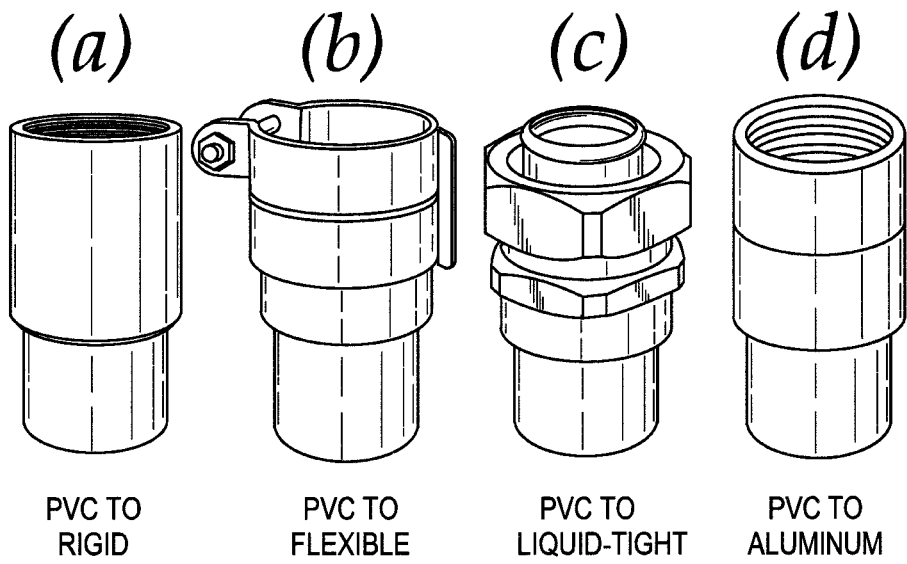
FIGS. 5a-d are diagrammatic views of coupling elements for practicing the present invention.
Figure 6:
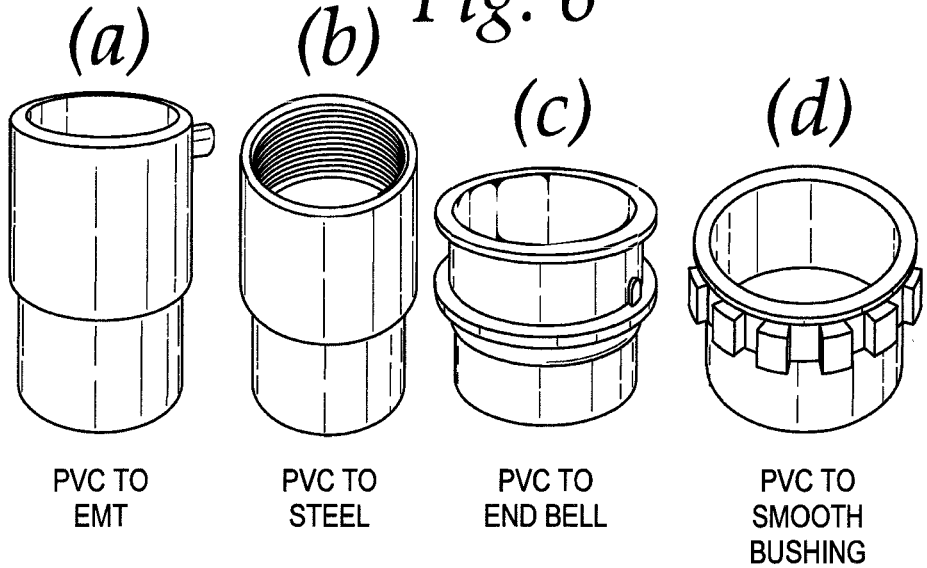
FIGS. 6a-d are diagrammatic views of additional coupling elements for practicing the present invention.

FIGS. 5 and 6 illustrate various configurations of the coupling element 14 that can be employed for practice of the present inventions, including configurations where in the coupling element comprises an assembly of polymeric and metallic components. Such assemblies include PVC and rigid metallic sections (FIG. 5a), PVC and flexible sections (FIG. 5b), PVC and liquid tite/liquid-tight sections (FIG. 5c), PVC and aluminum sections (FIG. 5d), PVC and EMT sections (FIG. 6a) and PVC and steel sections (FIG. 6b.) As noted, the coupling element 14 may be unitary in nature, comprising upper and lower polymeric sections, including PVC and end bell sections (FIG. 6c) and PVC and smooth bushing sections (FIG. 6d).

Advantages provided by the present invention will be readily apparent to those in the building trade. Reaming of components in ordinarily not required, and cost savings realized versus use of rigid nipple, and tape, and associated labor. Use of adhesive for joining components is efficient and secure. Components can be sized in a wide range of dimensions, such as from 0.5 to 6.0 inches. The present invention can be used in all aspects of construction, not just for repair applications.

The present invention finds widespread application for significant cost savings in installation, including use in waste water treatment plants, food processing plants, data centers, hospitals, stadiums, expo centers, light railways, military facilities, airports, and museums.

The invention claimed is:

1. A method of assembling conduit sections, the method comprising the steps of:
    providing a first conduit section within an associated concrete slab: providing a connector sleeve;
    adhering said connector sleeve with adhesive to said first conduit section so that said first conduit section extends upwardly within said connector sleeve;
    depositing concrete about said first conduit section and said connector sleeve to a grade level such that a top of said connector sleeve is at a same height as the grade level of the concrete;
    providing a coupling element having a lower polymeric section, and an upper section;
    adhering said coupling element with adhesive to said connector sleeve, with said polymeric section of said coupling element extending downwardly within said connector sleeve, so that said coupling element projects above said deposited concrete; and
    joining a second conduit section to said upper section of said coupling element, to thereby join said second conduit section to said first conduit section,
    wherein said connector sleeve includes an internal, annular shoulder, said first conduit section extending upwardly within said connector sleeve to abut a lower surface of said internal, annular shoulder, and said lower polymeric section of said coupling element extending downwardly within said connector sleeve to abut an upper surface of said internal, annular shoulder.

2. The method of assembling conduit sections in accordance with claim 1, wherein
    said upper section of said coupling element comprises one of: (1) a galvanized rigid conduit; (2) a liquid-tight connector; and (3) a flexible coupling.

3. The method of assembling conduit sections in accordance with claim 1, wherein
    said upper section of said coupling element is metallic.

4. The method of assembling conduit sections in accordance with claim 1, wherein
    said upper section of said coupling element comprises polymeric material and is unitary with said lower polymeric section of said coupling element.

5. The method of assembling conduit sections in accordance with claim 1, wherein an inside diameter of said lower polymeric section of said coupling element corresponds to an inside diameter of said first conduit section.

6. A method of assembling conduit sections, the method comprising the steps of:

providing a first conduit section within an associated concrete slab: providing a connector sleeve;

adhering said connector sleeve with adhesive to said first conduit section so that said first conduit section extends upwardly within said connector sleeve;

depositing concrete about said first conduit section and said connector sleeve to a grade level such that a top of said connector sleeve is at a same height as the grade level of the concrete;

providing a coupling element having a lower polymeric section, and an upper section;

adhering said coupling element with adhesive to said connector sleeve, with said polymeric section of said coupling element extending downwardly within said connector sleeve, so that said coupling element projects above said deposited concrete; and joining a second conduit section to said upper section of said coupling element, to thereby join said second conduit section to said first conduit section, wherein the concrete is deposited directly against said first conduit section and said connector sleeve.

7. The method of assembling conduit sections in accordance with claim 6, wherein said upper section of said coupling element comprises one of: (1) a galvanized rigid conduit; (2) a liquid-tight connector; and (3) a flexible coupling.

8. The method of assembling conduit sections in accordance with claim 6, wherein said upper section of said coupling element is metallic.

9. The method of assembling conduit sections in accordance with claim 6, wherein said upper section of said coupling element comprises polymeric material and is unitary with said lower polymeric section of said coupling element.

10. The method of assembling conduit sections in accordance with claim 6, wherein an inside diameter of said lower polymeric section of said coupling element corresponds to an inside diameter of said first conduit section.

\* \* \* \* \*